United States Patent
Singla et al.

(10) Patent No.: US 10,693,895 B2
(45) Date of Patent: *Jun. 23, 2020

(54) SECURITY INDICATOR ACCESS DETERMINATION

(71) Applicant: MICRO FOCUS LLC, Santa Clara, CA (US)

(72) Inventors: Anurag Singla, Sunnyvale, CA (US); Amir Kibbar, Yehud (IL); Tomas Sander, Princeton, NJ (US); Edward Ross, Austin, TX (US); Serhan Shbeita, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 15/328,023

(22) PCT Filed: Jul. 22, 2014

(86) PCT No.: PCT/US2014/047579
§ 371 (c)(1),
(2) Date: Jan. 21, 2017

(87) PCT Pub. No.: WO2016/014030
PCT Pub. Date: Jan. 28, 2016

(65) Prior Publication Data
US 2017/0180405 A1    Jun. 22, 2017

(51) Int. Cl.
*G06F 21/56* (2013.01)
*H04L 29/06* (2006.01)
*G06F 21/62* (2013.01)

(52) U.S. Cl.
CPC ...... *H04L 63/1425* (2013.01); *G06F 21/6218* (2013.01); *H04L 63/1441* (2013.01);
(Continued)

(58) Field of Classification Search
None
See application file for complete search history.

(56) References Cited

U.S. PATENT DOCUMENTS 8,176,078 B1    5/2012    Singer et al.
8,484,726 B1    7/2013    Sutton
(Continued)

OTHER PUBLICATIONS

European Patent Office, Extended European Search Report for Appl. No. 14898148.3-1213 I 3172689 PCT/US2014047579 dated Feb. 21, 2018 (8 pages).
(Continued)

*Primary Examiner* — Brandon S Hoffman

(57) ABSTRACT

According to an example, security indicator access determination may include determining a security indicator that is received from a first entity by a security indicator sharing platform for sharing with a second entity. A rule associated with identification of a third entity that has access to the security indicator may be analyzed. The third entity may be different from the second entity, and if the second entity belongs to a community, the third entity may not be in the community of the second entity. A determination may be made as to whether to identify the third entity based on the analysis of the rule. In response to a determination that the third entity is to be identified or not to be identified, the third entity may be identified to the first entity, or not identified to the first entity.

20 Claims, 4 Drawing Sheets

(52) U.S. Cl.
CPC ...... *H04L 63/20* (2013.01); *G06F 2221/2115* (2013.01); *G06F 2221/2141* (2013.01); *G06F 2221/2147* (2013.01)

(56) References Cited

U.S. PATENT DOCUMENTS

| | | |
|---|---|---|
| 2007/0244981 A1 | 10/2007 | Malden et al. |
| 2008/0288330 A1 | 11/2008 | Hildebrand et al. |
| 2009/0043773 A1 | 2/2009 | Frazier et al. |
| 2009/0300739 A1 | 12/2009 | Nice et al. |
| 2010/0077481 A1 | 3/2010 | Polyakov et al. |
| 2011/0209196 A1* | 8/2011 | Kennedy ................ G06F 21/55 726/1 |
| 2012/0110633 A1 | 5/2012 | An et al. |
| 2012/0260340 A1 | 10/2012 | Morris et al. |
| 2013/0055076 A1 | 2/2013 | Assadollahi |
| 2013/0074188 A1* | 3/2013 | Giakouminakis ....... G06F 21/57 726/25 |
| 2013/0086685 A1* | 4/2013 | Haynes ................ G06F 21/552 726/25 |
| 2014/0007190 A1 | 1/2014 | Alperovitch et al. |

OTHER PUBLICATIONS

"Information Security Indicators (ISI)," Apr. 2013, pp. 1-62, Group Specification, ETSI GS ISI 001-1, V1.1.1, European Telecommunications Standards Institute.

International Search Report and Written Opinion, International Application No. PCT/US2014/047579, dated Feb. 25, 2015, pp. 1-9, KIPO.

\* cited by examiner

200

```
┌─────────────────────────────────────────────────┐
│ DETERMINE A SECURITY INDICATOR THAT IS RECEIVED │
│ FROM A FIRST ENTITY BY A SECURITY INDICATOR     │
│ SHARING PLATFORM FOR SHARING WITH A SECOND      │
│ ENTITY                                          │
│                       202                       │
└─────────────────────────────────────────────────┘
                         ↓
┌─────────────────────────────────────────────────┐
│ ANALYZE A RULE ASSOCIATED WITH IDENTIFICATION   │
│ OF A THIRD ENTITY THAT HAS ACCESS TO THE        │
│ SECURITY INDICATOR                              │
│                       204                       │
└─────────────────────────────────────────────────┘
                         ↓
┌─────────────────────────────────────────────────┐
│ DETERMINE WHETHER TO IDENTIFY THE THIRD         │
│ ENTITY BASED ON THE ANALYSIS OF THE RULE        │
│                       206                       │
└─────────────────────────────────────────────────┘
                         ↓
┌─────────────────────────────────────────────────┐
│ IN RESPONSE TO A DETERMINATION THAT THE THIRD   │
│ ENTITY IS TO BE IDENTIFIED BASED ON THE         │
│ ANALYSIS OF THE RULE, IDENTIFY THE THIRD        │
│ ENTITY TO THE FIRST ENTITY                      │
│                       208                       │
└─────────────────────────────────────────────────┘
                         ↓
┌─────────────────────────────────────────────────┐
│ IN RESPONSE TO A DETERMINATION THAT THE THIRD   │
│ ENTITY IS NOT TO BE IDENTIFIED BASED ON THE     │
│ ANALYSIS OF THE RULE, NOT IDENTIFY THE THIRD    │
│ ENTITY TO THE FIRST ENTITY                      │
│                       210                       │
└─────────────────────────────────────────────────┘
```

FIG. 2

SECURITY INDICATOR ACCESS DETERMINATION

BACKGROUND

Security indicators typically include any type of specific or non-specific information related to a security threat. For example, a security indicator may include an Internet Protocol (IP) address related to a security threat. According to another example, a security indicator may include specific information related to a particular type of malware, or any non-specific information related to malware generally. A security indicator may also include any type of parameter or attribute that may be tracked with respect to a security threat. Users of security indicator sharing platforms typically share such security indicators with other users in an effort to advise the other users of any security threats, or to gain information related to a security threat from other users. The other users with whom the security indicator is shared typically belong to a community that is selected by the user for sharing, or to the same community as the user. The other users of such communities may further share the security indicator with further users and/or communities.

BRIEF DESCRIPTION OF DRAWINGS

Features of the present disclosure are illustrated by way of example and not limited in the following figure(s), in which like numerals indicate like elements, in which:

FIG. 2 illustrates a method for security indicator access determination, according to an example of the present disclosure;

DETAILED DESCRIPTION

Figure 1:
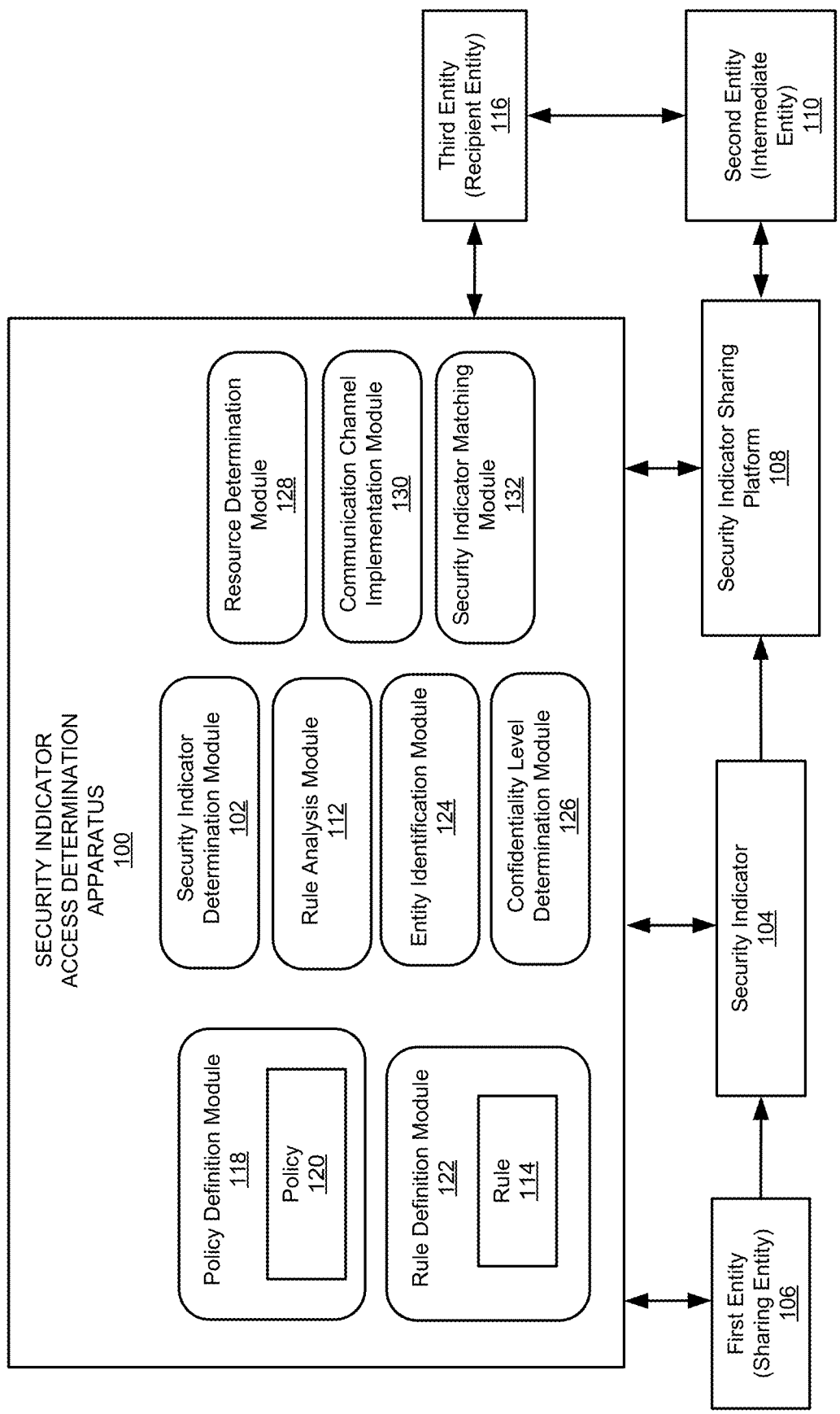
FIG. 1 illustrates an architecture of a security indicator access determination apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Users of security indicator sharing platforms typically share security indicators with other users in an effort to advise the other users of any security threats, or to gain information related to a security threat from the other users. However, once the security indicators are shared via the security indicator sharing platforms, the original users (i.e., the original sharers) do not have visibility about which other entity or community has access to the security indicators, beyond the entity or community that the security indicators were explicitly shared with. An entity may include an individual, organization, or any unit that may send or receive the security indicator. A community may include a plurality of entities. For example, a community may include a plurality of individuals (i.e., entities) in a particular area of interest. A community may include a global community where any entity may join, for example, via subscription. A community may also be a vertical-based community. For example, a vertical-based community may be a healthcare or a financial community. A community may also be a private community with a limited number of selected entities.

According to examples, a security indicator access determination apparatus and a method for security indicator access determination are disclosed herein. For the apparatus and method disclosed herein, the security indicator may be originally shared by an entity with a community, and from the perspective of sharing entity, the security indicator would be limited to availability to the submitted community. The security indicator may however be shared with other communities also by other entities. The apparatus and method disclosed herein may identify and highlight to the submitter of the security indicator all entities and communities that have access to the security indicator. This aspect may represent identification of parties that have access to the security indicator. The apparatus and method disclosed herein may generally provide for identification of a correct confidentiality level for the security indicator, resources needed to protect a presumably confidential security indicator that may not be already known to other entities, and facilitate collaboration among entities that have the same knowledge about the security indicator. The confidentiality level may represent aspects related to determination of who should have access to a security indicator (and does not have so already), and/or a determination of a type of access someone should have (e.g., "use this on a secure/hardened platform"). Further, the resources needed to protect a presumably confidential security indicator may represent aspects related to a determination of a type of access someone should have. The correctness of the confidentiality level for the security indicator may be set with respect to policies of the security indicator sharing platform, and/or with respect to certain achieving security objectives, such as protecting a high-level infrastructure sector from a catastrophic failure, etc.

With respect to the correct confidentiality level for the security indicator, without identification of the correct confidentiality level for the security indicator, the submitter (i.e., the original sharer) of the security indicator may attempt to over-protect the security indicator. For example, the submitter of the security indicator may be unaware of whether the security indicator is confidential or not confidential, and thus attempt to protect or over-protect the security indicator, or fail to protect a confidential security indicator. Confidentiality levels for a security indicator may include, for example, high, medium, and low confidentiality.

With respect to resources needed to protect a presumably confidential security indicator that may not be already known to other entities, based on the identification of the correct confidentiality level for the security indicator, appropriate safeguards (e.g., security protocols, security layers, etc.) may be used to protect confidentiality for the security indicator.

With respect to collaboration among entities that have the same knowledge about the security indicator, the submitter of the security indicator may not be aware of other entities that have knowledge of the security indicator and thus attempt to maintain confidentiality of the security indicator from such entities. In this regard, the submitter of the security indicator may also fail to collaborate with such entities as to various aspects related to the security indicator. For example, a submitter of the security indicator in a financial community may not be aware that the security indicator is already available to others in a government community who may have derived the security indicator from another source or otherwise become aware of the security indicator independently. For example, access to a security indicator may be related to access by a recipient entity to a security indicator that is shared with the recipient entity, or access by a recipient entity to a security indicator that is independently obtained by the recipient entity. In this regard, identification of who (e.g., the government community) has access to the security indicator may provide invaluable information to the submitter of the security indicator so that the submitter may determine the correct confidentiality level (if any) to protect the security indicator. In this regard, the submitter of the security indicator may collaborate with other entities that are aware of the security indicator on a case-by-case basis.

The collaboration may be direct collaboration among the participants of a security indicator sharing platform, through a community (anonymously or pseudo-anonymously), or federated by a security indicator sharing platform to provide complete anonymity to the collaborating entities. For example, the apparatus and method disclosed herein may provide for collaboration between different entities on an anonymous (e.g., name of entity or community designated as user-1) or pseudo-anonymous (e.g., name of banking entity or community designated as bank-1) basis to prevent disclosure of specific information (e.g., name, location, etc.) related to an entity, unless the entities involved in the collaboration themselves decide (e.g., based on mutual interest) to share such identifying information. With respect to federation, the collaboration may be provided with any number (e.g., 1 or greater than 1) entities and/or communities via the security indicator sharing platform. In certain cases, due to privacy, permissions and other policies, it may not be feasible to disclose information about who else has access to the same security indicator.

The apparatus and method disclosed herein may provide a rule-based approach to highlight information related to who else has access to the same security indicator to the participants of a security indicator sharing platform. Generally, the rule-based approach may include rules related to when and/or who to disclose information related to a security indicator. Further, the rule-based approach may include an aggregative aspect to provide for disclosure of information related to a security indicator based on an aggregated value related to the sharing entity, the security indicator, and/or the recipient entity. For example, the aggregative aspect may provide for disclosure of a number of entities and/or communities that have access to a security indicator.

According to another example, an attacker (e.g., an unauthorized user, or a user with malicious intent) may attempt to determine who (e.g., someone in a financial community) has access to a security indicator to determine whether to use the security indicator for malicious purposes. For example, an attacker may attempt to determine who (e.g., someone in a financial community) has access to a plurality of security indicators (e.g., particular IP addresses) to determine whether to use other related or similar security indicators (e.g., other IP addresses) for malicious purposes. However, the rules described herein may protect entities from providing such attackers with information that may be used for malicious purposes.

The apparatus and method disclosed herein may generally provide for identification of communities or entities that have access to a particular security indicator and/or related data based, for example, on policies and related rules, and actual availability of security indicators to different communities and individual entities. The related data may include any type of data related to a particular security indicator, such as comments, descriptions, threat intelligence, etc. Generally, a policy may include relatively higher level aspects related to identification of an entity that has access to a security indicator (e.g., identify all entities that have access to the security indicator). Further, a rule may include more specific implementations of the policy (e.g., identify all entities that have access to the security indicator, except private entities).

The apparatus and method disclosed herein may thus facilitate determination of associations between a security indicator and entities that have access to the security indicator beyond the original sharing policy of a submitter (i.e., the original sharing entity), as well as sharing of the access information in a rule-driven manner. The sharing policy may specify the sharing specifics related to the submitter of the security indicator (e.g., which communities are accessible to a submitter for sharing, what type of security indicator may be shared by a submitter, etc.).

According to an example, a security indicator access determination apparatus is disclosed herein and may include at least one processor, and a memory storing machine readable instructions that when executed by the at least one processor cause the at least one processor to determine a security indicator that is shared from a security indicator sharing platform with a recipient entity (e.g., a third entity). The security indicator may be provided to the security indicator sharing platform by a sharing entity (e.g., a first entity) for sharing with an intermediate entity (e.g., a second entity). The machine readable instructions may further cause the at least one processor to analyze a rule associated with identification of the recipient entity that has access to the security indicator to the sharing entity or identification of the sharing entity and/or the intermediate entity to the recipient entity. The recipient entity may be different from the intermediate entity, and if the intermediate entity belongs to a community, the recipient entity may not be in the community of the intermediate entity. The machine readable instructions may further cause the at least one processor to determine whether to identify the recipient entity to the sharing entity or the sharing entity and/or the intermediate entity to the recipient entity based on the analysis of the rule.

The apparatus and method disclosed herein may be applicable to sharing of any type of information, where the information may include the security indicator as described herein, or any other information, such as, for example, images, files, etc.

FIG. 1 illustrates an architecture of a security indicator access determination apparatus 100 (hereinafter also referred to as "apparatus 100"), according to an example of the present disclosure. Referring to FIG. 1, the apparatus 100 is depicted as including a security indicator determination module 102 to determine a security indicator 104 that is received from a first entity 106 (e.g., a sharing entity) by a security indicator sharing platform 108 for sharing with a second entity 110 (e.g., an intermediate entity).

A rule analysis module 112 is to analyze a rule 114 associated with identification of a third entity 116 (e.g., a recipient entity) that has access to the security indicator 104. The third entity 116 may be different from the second entity 110, and if the second entity 110 belongs to a community, the third entity 116 is not in the community of the second entity 110.

A policy definition module 118 is to define a policy 120 to identify an entity (or a community) that has access to the security indicator 104. The policy 120 may include a plurality of policies. The policy 120 may generally include relatively higher level aspects related to identification of an entity or community that has access to the security indicator 104 (e.g., identify all entities that have access to the security indicator).

A rule definition module 122 is to define the rule 114 that includes more specific implementations of the policy 120 (e.g., identify all entities that have access to the security indicator, except private entities). The rule 114 may include a plurality of rules.

An entity identification module 124 is to determine whether to identify the third entity 116 based on the analysis of the rule 114. In response to a determination that the third entity 116 is to be identified based on the analysis of the rule 114, the entity identification module 124 is to identify the third entity 116 to the first entity 106. Further, in response to a determination that the third entity 116 is not to be identified based on the analysis of the rule 114, the entity identification module 124 is to not identify the third entity 116 to the first entity 106.

A confidentiality level determination module 126 is to determine a confidentiality level for the security indicator 104 based on the identification of the third entity 116. For example, the confidentiality level determination module 126 may determine confidentiality levels for the security indicator 104 that include high, medium, and low confidentiality levels.

A resource determination module 128 is to determine resources that are needed to protect from unauthorized disclosure of the security indicator 104 based on the determination of the confidentiality level for the security indicator 104. For example, the resource determination module 128 is to determine security protocols, security layers, etc. to protect confidentiality of the security indicator 104. For example, based on a high confidentiality level, the resource determination module 128 may determine a corresponding high level security protocol for protecting confidentiality of the security indicator 104.

A communication channel implementation module 130 is to implement a communication channel between the first entity 106 and the third entity 116 to facilitate collaboration between the first entity 106 and the third entity 116. For example, as described herein, the collaboration provided by the communication channel implementation module 130 may be direct collaboration among the participants of the security indicator sharing platform 108, through a community (anonymously or pseudo-anonymously), or federated by the security indicator sharing platform 108 to provide complete anonymity to the collaborating entities.

A security indicator matching module 132 is to compare different security indicators and determine a match between the different security indictors. For example, a security indicator related to an IP address or an e-mail may include different formats for different entities. The security indicator matching module 132 may determine whether different security indicators between different entities and/or communities are the same or similar to thus facilitate determination of entities and/or communities that have access to the security indicators in question, and other access related aspects for such entities and/or communities.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

According to an example, the entity identification module 124 may apply the rule 114 that includes identification of a name (or a community or another attribute) of the third entity 116 to the first entity 106 if a predetermined number of entities in a community of the third entity 116 have access to the security indicator 104. According to another example, the entity identification module 124 may apply the rule 114 that includes identification of a name (or a community or another attribute) of the third entity 116 to the first entity 106 if a predetermined percentage of entities in a community of the third entity 116 have access to the security indicator 104. Generally, the rule 114 in this regard may include identification of the name of an entity and/or community (e.g., financial community) if a predetermined number (e.g., k) of entities, or a predetermined percentage (e.g., x %) of entities in the particular community (e.g., the financial community) have access to the security indicator 104. In this regard, the entity identification module 124 may apply a rule-based aggregative approach to determining whether to identify the name of the entity and/or community. Further, the name of the entity and/or community may be identified if the entity and/or community is not private.

According to another example, the entity identification module 124 may apply the rule 114 that includes identification of a name of the third entity 116 to the first entity 106 if the security indicator 104 has been shared in private communities. Generally, the rule 114 in this regard may include identification of the name of an entity to those who also have access to the security indicator 104, if the security indicator 104 has been shared in private communities. In this regard, the identification of the name of the entity may be limited to those who also have access to the security indicator 104, if the security indicator 104 is limited to being shared in private communities. Subsequent collaboration may be direct or federated through the security indicator sharing platform 108. Further, the name of the entity that is identified may be real or obfuscated. In this regard, the entity identification module 124 may apply a rule-based approach (i.e., a rule-based non-aggregative approach) to determine whether to identify the name of the entity.

According to another example, the entity identification module 124 may apply the rule 114 that includes identification of a name of the third entity 116 to the first entity 106 if the first entity 106 is on a pre-generated list of entities. Generally, the rule 114 in this regard may include identification of the name of the entity or community to a pre-generated list of entities and/or communities (e.g., from financial to government), for example, if the entity and/or community is respectively on the pre-generated list of entities and/or communities. In this regard, the identification of the name of the entity and/or community may be limited to the pre-generated list of communities. In this regard, the entity identification module 124 may apply a rule-based approach (i.e., a rule-based non-aggregative approach) to the determination of whether to identify the name of the community or entity. For example, a government entity may be entitled to receive identification of the name of a financial entity that is related to a security indicator to facilitate collaboration between such entities.

According to another example, the entity identification module 124 may apply the rule 114 that includes identification of a name of the third entity 116 to the first entity 106 if the first entity 106 has a rating that exceeds a predetermined rating threshold. According to another example, the entity identification module 124 may apply the rule 114 that includes identification of a name of the recipient entity (e.g., the third entity 116) to the sharing entity (e.g., the first entity 106) if the sharing entity has submitted at least a predetermined number of security indicators including the security indicator 104 to the security indicator sharing platform 108. According to another example, the entity identification module 124 may apply the rule 114 that includes identification of a name of the recipient entity (e.g., the third entity 116) to the sharing entity (e.g., the first entity 106) if the sharing entity has submitted security indicators including the security indicator 104 to the security indicator sharing platform 108 for at least a predetermined time period. Generally, the rule 114 in this regard may include identification of the name of the community or entity to participants (i.e., the sharing entity) with a predetermined rating (e.g., n or higher). In this regard, the identification of the name of the community or entity may be limited to the participants with a predetermined rating (e.g., n or higher). Alternatively or additionally, the entity identification module 124 may identify the name of the community or entity to participants (i.e., the sharing entity) based on other factors. For example, the entity identification module 124 may identify the name of the community or entity to participants who have submitted a predetermined number (e.g., x) of security indicators to the security indicator sharing platform 108. According to another example, the entity identification module 124 may identify the name of the community or entity to participants who have been a participant of the security indicator sharing platform 108 for a predetermined number (e.g., x) of days (or months, years, etc.). In this regard, the entity identification module 124 may apply a rule-based approach (i.e., a rule-based non-aggregative approach) to the determination of whether to identify the name of the community or entity. This rule-based approach may be used to prevent certain entities (e.g., attackers) that are attempting to gain knowledge of who has access to a particular security indicator by analyzing aspects such as ratings, number of previously submitted security indicators, and length of time the submitters have been a participant of the security indicator sharing platform 108. The rule-based approach may be further used to assure that certain entities (e.g., authorized entities) have access to a particular security indicator by analyzing aspects such as ratings, number of previously submitted security indicators, and length of time the submitters have been a participant of the security indicator sharing platform 108.

According to another example, the entity identification module 124 may apply the rule 114 that includes an indication that an entity in a community of the sharing entity (e.g., the first entity 106) has access to the security indicator 104 without disclosing a name of the entity in the community of the sharing entity. According to another example, the entity identification module 124 may apply the rule 114 that includes an indication of a number of entities in a community of the sharing entity (e.g., the first entity 106) that have access to the security indicator 104 without disclosing a name of any of the entities in the community of the sharing entity. Generally, the rule 114 in this regard may include an indication that someone out of the user's (e.g., the first entity 106) communities has access to the security indicator 104 without disclosing the name of the community or the entity.

In this manner, the identity of those who have access to the security indicator may be safeguarded. According to another example, the entity identification module 124 may disclose that x number or k % of members out of the user's communities have access to the security indicator without disclosing the name of the community or the entity. In this regard, the entity identification module 124 may apply a rule-based aggregative approach to determining whether to disclose that someone out of the user's communities has access to the security indicator 104 without disclosing the name of the community or the entity. Further, the granularity in this case may be coarser compared to other disclosure scenarios. For example, with respect to granularity, the indication that someone out of the user's communities has access to the security indicator 104 without disclosing the name of the community or the entity may be coarser (i.e., include reduced granularity) compared to disclosing the name of the community or specific entities within a community.

The information related to the security indicator 104 may be made accessible via the security indicator sharing platform 108 in a textual or graphical manner. Alternatively or additionally, the information related to the security indicator 104 may be made accessible via the security indicator sharing platform 108 through application programming interfaces (APIs). Entities may also subscribe to notifications for when additional access to the information is identified out of the communities where the information was originally shared. The availability of information may also be identified.

Figure 3:
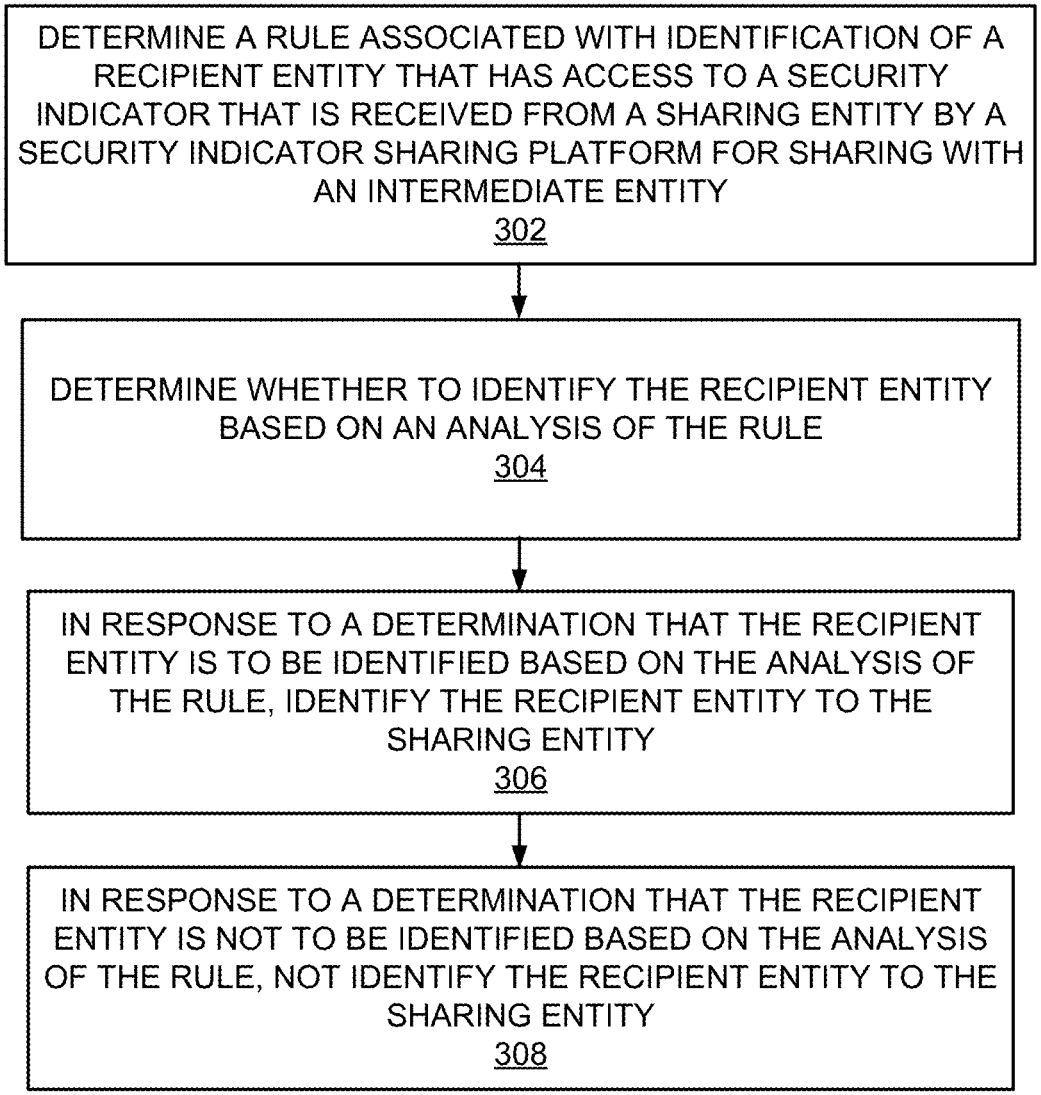
FIG. 3 illustrates further details of the method for security indicator access determination, according to an example of the present disclosure.

FIGS. 2 and 3 respectively illustrate flowcharts of methods 200 and 300 for security indicator access determination, corresponding to the example of the security indicator access determination apparatus 100 whose construction is described in detail above. The methods 200 and 300 may be implemented on the security indicator access determination apparatus 100 with reference to FIG. 1 by way of example and not limitation. The methods 200 and 300 may be practiced in other apparatus.

Referring to FIG. 2, for the method 200, at block 202, the method may include determining a security indicator that is received from a first entity by a security indicator sharing platform for sharing with a second entity. For example, referring to FIG. 1, the security indicator determination module 102 may determine the security indicator 104 that is received from the first entity 106 (e.g., a sharing entity) by the security indicator sharing platform 108 for sharing with the second entity 110 (e.g., an intermediate entity).

At block 204, the method may include analyzing a rule associated with identification of a third entity that has access to the security indicator. For example, referring to FIG. 1, the rule analysis module 112 may analyze the rule 114 associated with identification of the third entity 116 (e.g., a recipient entity) that has access to the security indicator 104. The third entity 116 may be different from the second entity 110, and if the second entity 110 belongs to a community, the third entity 116 is not in the community of the second entity 110.

At block 206, the method may include determining whether to identify the third entity based on the analysis of the rule. For example, referring to FIG. 1, the entity identification module 124 may determine whether to identify the third entity 116 based on the analysis of the rule 114.

In response to a determination that the third entity is to be identified based on the analysis of the rule, at block 208, the method may include identifying the third entity to the first entity. For example, referring to FIG. 1, in response to a determination that the third entity 116 is to be identified based on the analysis of the rule 114, the entity identification module 124 may identify the third entity 116 to the first entity 106.

In response to a determination that the third entity is not to be identified based on the analysis of the rule, at block 210, the method may include not identifying the third entity to the first entity. For example, referring to FIG. 1, in response to a determination that the third entity 116 is not to be identified based on the analysis of the rule 114, the entity identification module 124 may not identify the third entity 116 to the first entity 106.

According to an example, in response to a determination that the first entity 106 and/or the second entity 110 is to be identified based on the analysis of the rule 114, the method 200 may include identifying the first entity 106 and/or the second entity 110 to the third entity 116.

According to an example, in response to a determination that the first entity 106 and/or the second entity 110 is not to be identified based on the analysis of the rule 114, the method 200 may include not identifying the first entity 106 and/or the second entity 110 to the third entity 116.

According to an example, the method 200 may include determining a confidentiality level for the security indicator based on the identification of the third entity. For example, referring to FIG. 1, the confidentiality level determination module 126 may determine a confidentiality level for the security indicator 104 based on the identification of the third entity 116.

According to an example, the method 200 may include determining resources that are needed to protect from unauthorized disclosure of the security indicator based on the determination of the confidentiality level for the security indicator. For example, referring to FIG. 1, the resource determination module 128 may determine resources that are needed to protect from unauthorized disclosure of the security indicator 104 based on the determination of the confidentiality level for the security indicator 104.

According to an example, the method 200 may include implementing a communication channel between the first entity and the third entity to facilitate collaboration between the first entity and the third entity. For example, referring to FIG. 1, the communication channel implementation module 130 may implement a communication channel between the first entity 106 and the third entity 116 to facilitate collaboration between the first entity 106 and the third entity 116.

Referring to FIG. 3, for the method 300, at block 302, the method may include determining a rule associated with identification of a recipient entity that has access to a security indicator that is received from a sharing entity by a security indicator sharing platform for sharing with an intermediate entity. For example, referring to FIG. 1, the rule analysis module 112 may determine a rule 114 associated with identification of a recipient entity (e.g., the third entity 116) that has access to a security indicator 104 that is received from a sharing entity (e.g., the first entity 106) by a security indicator sharing platform 108 for sharing with an intermediate entity (e.g., the second entity 110).

At block 304, the method may include determining whether to identify the recipient entity based on an analysis of the rule. For example, referring to FIG. 1, the entity identification module 124 may determine whether to identify the recipient entity based on an analysis of the rule 114.

In response to a determination that the recipient entity is to be identified based on the analysis of the rule, at block 306, the method may include identifying the recipient entity to the sharing entity. For example, referring to FIG. 1, in response to a determination that the recipient entity is to be identified based on the analysis of the rule 114, the entity identification module 124 may identify the recipient entity to the sharing entity.

In response to a determination that the recipient entity is not to be identified based on the analysis of the rule, at block 308, the method may include not identifying the recipient entity to the sharing entity. For example, referring to FIG. 1, in response to a determination that the recipient entity is not to be identified based on the analysis of the rule 114, the entity identification module 124 may not identify the recipient entity to the sharing entity.

Figure 4:
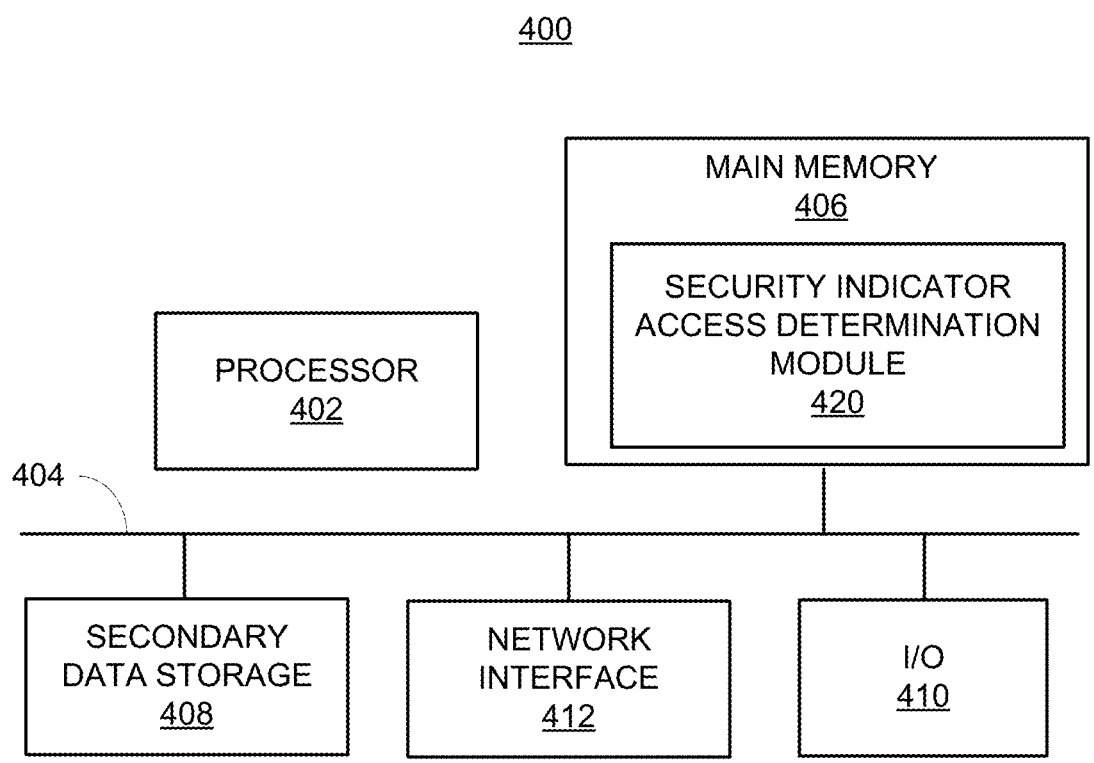
FIG. 4 illustrates a computer system, according to an example of the present disclosure.

FIG. 4 shows a computer system 400 that may be used with the examples described herein. The computer system 400 may represent a generic platform that includes components that may be in a server or another computer system. The computer system 400 may be used as a platform for the apparatus 100. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions and other processes described herein. Commands and data from the processor 402 may be communicated over a communication bus 404. The computer system may also include a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The main memory 406 may include a security indicator access determination module 420 including machine readable instructions residing in the main memory 406 during runtime and executed by the processor 402. The security indicator access determination module 420 may include the modules of the apparatus 100 shown in FIG. 1.

The computer system 400 may include an I/O device 410, such as a keyboard, a mouse, a display, etc. The computer system may include a network interface 412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A non-transitory computer readable medium having stored thereon machine readable instructions to provide security indicator access determination, the machine readable instructions, when executed, cause at least one processor to:

determine that a security indicator is received from a first entity for sharing with a second entity;

analyze a rule associated with identification of a third entity that has access to the security indicator, wherein the third entity is different from the second entity, and if the second entity belongs to a community, the third entity is not in the community of the second entity;

determine whether to identify the third entity based on the analysis of the rule;

in response to a determination that the third entity is to be identified based on the analysis of the rule, identify the third entity to the first entity; and in response to a determination that the third entity is not to be identified based on the analysis of the rule, not identify the third entity to the first entity.

2. The non-transitory computer readable medium of claim 1, wherein the machine readable instructions, when executed, further cause the at least one processor to:

determine a confidentiality level for the security indicator based on the identification of the third entity.

3. The non-transitory computer readable medium of claim 2, wherein the machine readable instructions, when executed, further cause the at least one processor to:

determine resources that are needed to protect from unauthorized disclosure of the security indicator based on the determination of the confidentiality level for the security indicator.

4. The non-transitory computer readable medium of claim 1, wherein the machine readable instructions, when executed, further cause the at least one processor to:

implement a communication channel between the first entity and the third entity to facilitate collaboration between the first entity and the third entity.

5. The non-transitory computer readable medium of claim 1, wherein the rule includes identification of a community or another attribute of the third entity to the first entity in response to a determination that a predetermined number of entities in the community of the third entity have access to the security indicator.

6. The non-transitory computer readable medium of claim 1, wherein the rule includes identification of a community or another attribute of the third entity to the first entity in response to a determination that a predetermined percentage of entities in the community of the third entity have access to the security indicator.

7. The non-transitory computer readable medium of claim 1, wherein the rule includes identification of a name of the third entity to the first entity in response to a determination that the security indicator has been shared in private communities.

8. The non-transitory computer readable medium of claim 1, wherein the rule includes identification of a name of the third entity to the first entity in response to a determination that the first entity is on a pre-generated list of entities.

9. The non-transitory computer readable medium of claim 1, wherein the rule includes identification of a name of the third entity to the first entity in response to a determination that the first entity has a rating that exceeds a predetermined rating threshold.

10. The non-transitory computer readable medium of claim 1, wherein the second entity is included in a first community, and wherein the third entity is not included in the first community.

11. A security indicator access determination apparatus comprising:

at least one processor; and a memory storing machine readable instructions that when executed by the at least one processor cause the at least one processor to:

determine that a security indicator is shared from a security indicator sharing platform with a recipient entity, wherein the security indicator is provided to the security indicator sharing platform by a sharing entity for sharing with an intermediate entity;

analyze a rule associated with identification of the recipient entity that has access to the security indicator to the sharing entity or identification of at least one of: the sharing entity and the intermediate entity to the recipient entity, wherein the recipient entity is different from the intermediate entity, and if the intermediate entity belongs to a community, the recipient entity is not in the community of the intermediate entity; and determine whether to identify the recipient entity to the sharing entity or at least one of: the sharing entity and the intermediate entity to the recipient entity based on the analysis of the rule.

12. The security indicator access determination apparatus according to claim 11, wherein the rule includes identification of a name of the recipient entity to the sharing entity in response to a determination that the sharing entity has submitted at least a predetermined number of security indicators including the security indicator to the security indicator sharing platform.

13. The security indicator access determination apparatus according to claim 11, wherein the rule includes identification of a name of the recipient entity to the sharing entity in response to a determination that the sharing entity has submitted security indicators including the security indicator to the security indicator sharing platform for at least a predetermined time period.

14. The security indicator access determination apparatus according to claim 11, wherein the intermediate entity is included in a first community, and wherein the recipient entity is not included in the first community.

15. A method for security indicator access determination, the method comprising:

determining, by at least one processor, a rule associated with identification of a recipient entity that has access to a security indicator that is received from a sharing entity by a security indicator sharing platform for sharing with an intermediate entity, wherein the recipient entity is different from the intermediate entity, and if the intermediate entity belongs to a community, the recipient entity is not in the community of the intermediate entity;

determining whether to identify the recipient entity based on an analysis of the rule;

in response to a determination that the recipient entity is to be identified based on the analysis of the rule, identifying the recipient entity to the sharing entity; and in response to a determination that the recipient entity is not to be identified based on the analysis of the rule, not identifying the recipient entity to the sharing entity.

16. The method according to claim 15, wherein the rule includes an indication that an entity in a community of the sharing entity has access to the security indicator without disclosing a name of the entity in the community of the sharing entity.

17. The method according to claim 15, wherein the rule includes an indication of a number of entities in a community of the sharing entity that have access to the security indicator without disclosing a name of any of the entities in the community of the sharing entity.

18. The method according to claim 15, wherein the intermediate entity is included in a first community, and wherein the recipient entity is not included in the first community.

19. The method according to claim 15, comprising:
implementing a communication channel between the sharing entity and the recipient entity to provide collaboration between the sharing entity and the recipient entity.

20. The method according to claim 15, wherein the rule includes identification of a community of the recipient entity to the sharing entity in response to a determination that a predetermined number of entities in the community of the recipient entity have access to the security indicator.

* * * * *